United States Patent Office 3,525,623
Patented Aug. 25, 1970

3,525,623
METHOD FOR PROCESSING A FAT CONTAINING ORGANIC MATERIAL
Sven-Olof Osterman, Molndal, Sweden, assignor to Astra Nutrition Aktiebolag, Molndal, Sweden, a Swedish company
No Drawing. Filed June 29, 1966, Ser. No. 561,416
Claims priority, application Sweden, July 5, 1965, 8,869/65
Int. Cl. A23j 1/04
U.S. Cl. 99—18                  9 Claims

ABSTRACT OF THE DISCLOSURE

Fats and other objectionable taste and odor-producing substances are removed from fish by dissolving them in a combination of water and an organic solvent having limited solubility in water. Suitable solvents are n-butanol, sec-butanol and isobutanol. The process is carried out at a temperature above normal room temperature.

---

This invention relates to a method of extracting fat and objectionable taste and odor producing substances from organic matter, such as fish and aquatic animals exemplified by whales and seals, for producing inexpensively a nutritional protein product of sufficiently high quality to be used for human consumption.

Fish and aquatic animals constitute large untapped reserves of protein and other valuable nutritional elements. The practical utilization of these reserves has been curtailed by the presence of offensive odors and tastes in the fats contained in the organic matter. Prior processes for the removal of these objectionable substances have either failed to remove sufficient quantities of them to produce a product meeting the standards for human consumption, or they have done so at a higher cost than would justify commercial production.

Proposals have been made to utilize certain water soluble organic solvents to extract the offensive substances from organic matter, but such organic solvents have required dry organic matter upon which to act. Otherwise, the water in the organic matter dilutes the solvent, and the solvent becomes less effective in extracting the offensive substances. Even minute traces of odor and taste producing substances render the product unfit for direct human consumption, and the use of the tainted product for animal feed has resulted in the distinctive taste of fish in the meat of the animal.

Proposals for the utilization of insoluble solvents permitted the use of organic matter containing water. However, many insoluble organic solvents, such as chlorinated hydrocarbons, are toxic and inefficient extractors of objectionable taste and odor producing substances. Proposals for the utilization of combinations of water soluble and insoluble organic solvents have required costly dehydration and disintegration processes and have been complicated by the difficulties of removing completely the oftentimes toxic organic solvent from the organic matter following the extraction.

It is, therefore, an object of this invention to provide an efficient and inexpensive method of removing virtually all traces of fats and objectionable taste and odor producing substances from organic matter, so that the product will be suitable for human consumption.

It is a further object of this invention to provide a method of washing virtually all traces of solvent from the organic matter following extraction of the objectionable substances.

Other objects of the invention will become apparent from the following description and claims.

According to the invention a limitedly soluble polar organic solvent is used to extract the objectionable substances from the organic matter. The polar organic solvents which are of sufficiently limited solubility in water to be utilized for the purpose are n-butanol, sec-butanol and isobutanol.

The invention is suitable for processing fresh fish, pressed fish, fish meal, or the meat of aquatic animals. The extraction should be carried out in the presence of water to ensure maximum dissolution of water soluble substances from the organic matter. The minimum water content should preferably be 5% of the solvent based on weight. The maximum water content is not critical. The necessary water may come from the water inherently present in the organic matter, and/or from prior saturation of the solvent with water. The extractions are carried out at a temperature above room temperature. The preferred embodiment of this invention carries out the extraction at a temperature below the azeotropic boiling point of the given solvent with water. The azeotropic boiling point, however, does not constitute a maximum temperature for the invention. The azeotropic boiling points of the butanols with water are: n-butanol 92.7° C.; sec-butanol 87.5° C.; and isobutanol 89.9° C.

After the extraction is complete, the solvent around the organic matter is preferably replaced with water by immersing the organic matter in water, thereby forcing the solvent to the surface of the water and effectively removing the solvent from the organic matter. The water is removed, and the resulting product is then dried by known means. It is suitable for human consumption.

The following examples illustrate, but in no way limit, the preferred application of this invention.

EXAMPLE 1

An extraction vessel of approximately 2 cubic meters capacity, capable of being heated, is filled to 60% capacity with 1,500 kilograms of comminuted fresh fish (herring) containing their natural water content. The vessel is heated until the organic matter has coagulated. Water saturated n-butanol (containing 20% water by weight) is then pumped into the extraction vessel through an inlet in the bottom of the vessel. The temperature of the vessel is maintained at approximately 70° centigrade, and a stirring device keeps the fish particles and solvent in motion. The solvent is forced by pressure up through the particles of fish to the top of the mass, at which point the solvent contains a maximum of 10% fat at 70° centigrade. The solvent at the top is then drawn off, separated from any sludge accompanying it, and cooled to room temperature. At this point three distinct layers are formed, i.e., a water phase, a fat phase above the water phase, and a fat-poor solvent phase on top. The solvent phase is separated, reheated and recirculated through the extraction vessel. The process is repeated until the fat content of the solvent drawn off is substantially the same as that of the solvent reintroduced at the bottom of the vessel. The quantity of circulating solvent in the extraction vessel is maintained at approximately 75% of the weight of the comminuted fish.

At the conclusion of the extraction process, water (containing about 7% solvent by weight) is pumped into the vessel from the bottom to displace the solvent upwardly from around the fish particles. The solvent is then drawn off the top leaving only water surrounding the fish particles. Pure solvent is then pumped into the bottom of the vessel and rises in droplet form through the water and fish particles. This solvent can be recirculated several times and finally drawn off the top of the water. The solvent remaining in the water phase is removed by distillation, preferably under vacuum, and can be reused.

If desired, the foregoing water displacement step may be omitted by separating the liquid solvent by decantation or filtration, followed by drying; or the water displacement procedure may be postponed to a later time.

EXAMPLE 2

The starting material is pressed fish, which is formed by pressing or centrifuging the fish to remove some water and fat. The extraction is carried out as in Example 1, except that the solvent is not recirculated. The pressing has so concentrated the fats that they are markedly more soluble at room temperature, and no fat separation occurs when the fat-rich solvent is drawn off the top of the fish mass and cooled. The same taste and odor free product is obtained as in Example 1.

EXAMPLE 3

The starting material is fish meal. It is preferably moistened in the extraction vessel with an equal proportion by weight of water, which can be the wash water from a prior extraction. Unmoistened fish meal, however, may be used if a water saturated solution of the polar organic solvent is used. The extraction is then carried out as in Example 2. The product obtained is free of objectionable fat, tastes and odors.

EXAMPLE 4

The same procedure is utilized as in Examples 1 and 2, except the solvent is sec-butanol. The extraction produces the same high quality product.

In instances where the end product is not to be used for human consumption, the extraction process may be interrupted prior to completion in order to produce an end product suitable for use as feed for non-meat producing animals, e.g., mink and other fur-bearing animals. It is of particular interest that the pH value in the extraction vessel needs no special adjustment for any of the extractions.

In the foregoing examples, sufficient water was present in the system so that two distinct phases were formed between the water and the n-butanol or sec-butanol in the extraction vessel during extraction. When isobutanol is used, however, an emulsion of fats and water sometimes forms in the water phase. This emulsion is preferably broken and separated prior to drawing off the solvent phase from the top of the organic matter in the extraction vessel.

I claim:

1. A process for removing fats and other taste and odor producing substances from organic material taken from fish to obtain a proteinaceous food product comprising:

immersing the organic material in a mixture consisting essentially of an alcohol of limited miscibility in water selected from the group consisting of n-butanol, sec-butanol, and isobutanol and a quantity of water sufficient to form a water phase separate from the solvent phase and capable of containing substantially all of the protein present in the organic material;

maintaining the material at a temperature above normal room temperature;

absorbing fats and other taste and odor producing substances in the solvent phase of the mixture while containing substantially all of the protein within the water phase; and removing the solvent phase and retaining a substantially untainted proteinaceous food product.

2. A process as set forth in claim 1 in which the extraction is carried out at a temperature below the azeotropic boiling point of the solvent with water.

3. A process as set forth in claim 1 in which said organic matter is the meat of fresh fish.

4. A process as set forth in claim 1 in which the said organic matter is moistened fish meal.

5. A process as set forth in claim 1 in which the said organic matter is pressed fish.

6. The process as set forth in claim 1 in which water is introduced into the extraction vessel following the extraction to replace the fat containing solvent from around the organic matter.

7. A process as set forth in claim 1 in which the fat-rich solvent is drawn off from above the organic matter, cooled to room temperature, separated from the extracted fat and water, reheated, and reintroduced into the extraction vessel for recirculation.

8. The process as st forth in claim 1 in which said organic matter contains substantially all of the water and fat naturally present in the fish material.

9. A process as set forth in claim 1 in which said organic matter is taken from a fatty fish.

References Cited

UNITED STATES PATENTS

| | | | |
|---|---|---|---|
| 2,831,889 | 4/1958 | Gaver et al. | 260—112 |
| 3,142,570 | 7/1964 | Thompson | 99—18 XR |
| 3,252,962 | 5/1966 | Whaley et al. | 99—18 XR |

FOREIGN PATENTS

| | | |
|---|---|---|
| 210,329 | 9/1957 | Australia. |
| 217,719 | 10/1958 | Australia. |

MAURICE W. GREENSTEIN, Primary Examiner

U.S. Cl. X.R.

99—209